A. H. ANTHONY AND C. E. NORDFELDT.
WHEEL CONSTRUCTION.
APPLICATION FILED NOV. 24, 1919.

1,396,310.

Patented Nov. 8, 1921.

Inventors.
Arthur H. Anthony
and
Charles E. Nordfeldt.
By Thurston Kwis & Hudson
attys

UNITED STATES PATENT OFFICE.

ARTHUR H. ANTHONY AND CHARLES E. NORDFELDT, OF MASSILLON, OHIO, ASSIGNORS TO THE MASSILLON STEEL CASTINGS COMPANY, OF MASSILLON, OHIO, A CORPORATION OF OHIO.

WHEEL CONSTRUCTION.

1,396,310.   Specification of Letters Patent.   Patented Nov. 8, 1921.

Application filed November 24, 1919. Serial No. 340,255.

*To all whom it may concern:*

Be it known that we, ARTHUR H. ANTHONY and CHARLES E. NORDFELDT, citizens of the United States, and residents, respectively, of Massillon, in the county of Stark and State of Ohio, and Massillon, in the county of Stark and State of Ohio, have invented a certain new and useful Improvement in Wheel Construction, of which the following is a full, clear, and exact description.

The present invention relates to a wheel fixed rim construction which is particularly intended and adapted for use where the wheel is of a metal construction, such as usually used upon trucks, where the fixed rim is adapted to receive a metal rim carrying a rubber tire.

The objects of the invention will appear more at large as the description proceeds.

Figure 1:
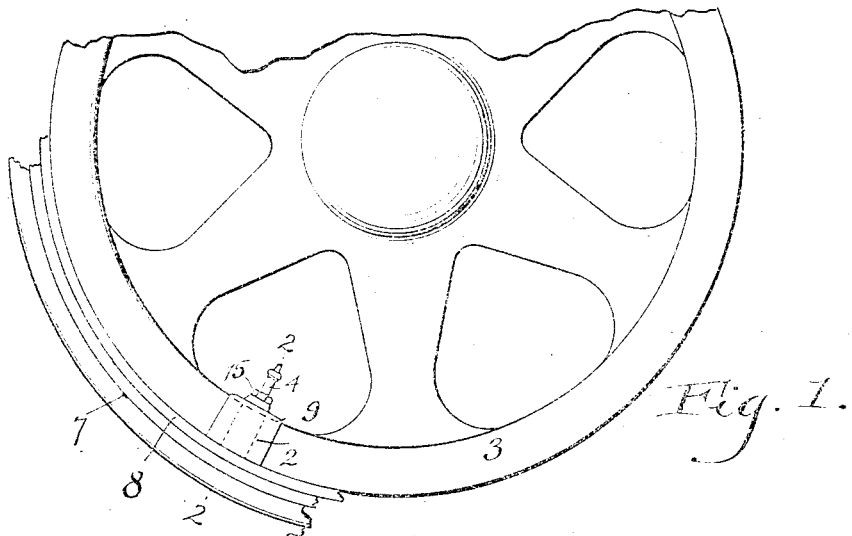
Figure 2:
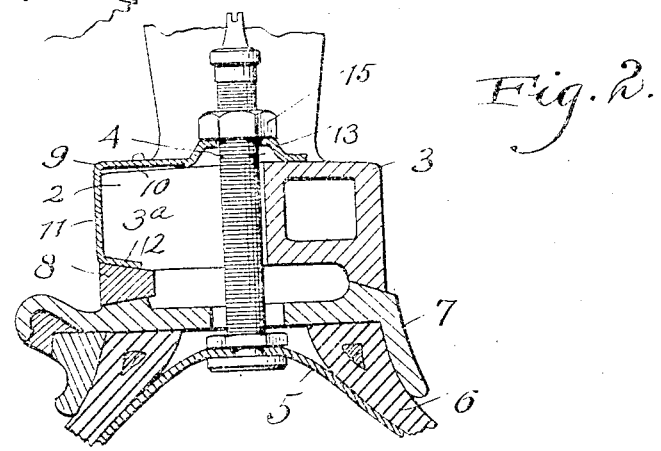
Figure 3:
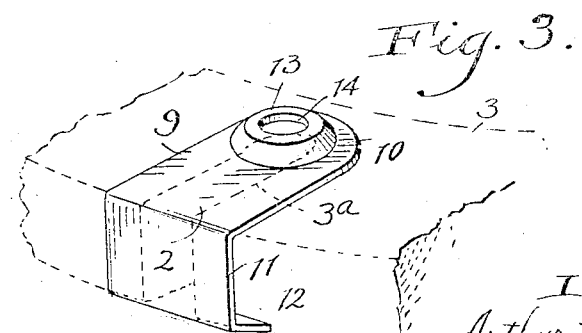

Reference should be had to the accompanying drawings forming a part of this specification in which Figure 1 shows an elevation, a portion of a wheel having the present invention applied thereto; Fig. 2 is a section on the line 2—2; Fig. 3 is a perspective view showing the application of the invention.

As is well known, pneumatic tires which are used in connection with wheels for heavy vehicles such as trucks are very large and are comparatively stiff and unyielding, even when the tire is deflated. For this reason it is not practical to mount a demountable rim on which there is a pneumatic tire of the type described, by inserting the valve stem through a hole provided in the fixed rim of the wheel. Such practice is very apt to injure the valve stem.

It has therefore been proposed in connection with wheels of the character described to provide a slot, such as indicated at 2 in Fig. 3, which extends transversely through one portion of the fixed rim and permits the valve stem to be slid through the slot when a demountable rim having a pneumatic tire mounted thereon is placed on the felly.

This slot is of course exposed at all times during the use of the wheel and it usually happens that the slot becomes clogged with mud and additionally through the slot mud and water find their way into the interior of the fixed rim of the wheel and cause a rusting action between the fixed rim and the demountable rim which makes it exceedingly difficult to demount a rim when such is desired.

In the present invention it is our purpose to provide a cover for the slot which is so constructed and assembled with respect to the fixed rim of the wheel, the valve stem and the rim, that the cover is securely locked and held in place and fully protects against the entrance of dirt and water through the slot.

Referring to the drawings, 3 indicates the fixed rim of a hollow cast steel wheel, this fixed rim being provided with a slot, as indicated, which is adapted to receive the valve stem 4, which is secured to the inner tube 5 carried within the tire casing 6, which casing is mounted upon a demountable rim 7.

For the purpose of locking the demountable rim 7 on the fixed rim 3 when the rim is in place, a wedge ring 8 is employed which is held in proper position by any desired means not shown. The use of a wedge ring and the means for holding it are commonly used in the art and no extended description is needed.

When the demountable rim with the tire thereon is mounted upon the fixed rim of the wheel, the valve stem occupies the slot 2 and extends a slight distance beyond the inner face of the fixed rim 3.

Mounted upon the fixed rim 3 is a cover plate 9. This cover plate has an inwardly extending portion 10 which lies against the inner surface of the fixed rim 3. The cover plate also has a part indicated at 11 which extends at substantially right angles to the part 10 of the cover plate and is adapted to lie against the side of the fixed rim 3. The portion 11 has an extension 12 which is adapted to be engaged by the wedge ring 8 when the same is in place so that the end of the cover plate is securely held between the wedge ring and the slanting surface 3ª of the fixed rim with which the wedge ring coöperates.

As will be understood, the cover plate 9 is of sufficient width to cover the slot 2 and extend a slight distance beyond opposite sides of the slot.

The cover plate 9 adjacent the place where the valve stem extends through the fixed rim is provided with a boss portion 13 which has a central opening 14 through which the valve stem 4 may extend. This boss portion is adapted to be contacted by the usual rim nut 15 which serves not only to position and hold the valve stem 4, but also securely holds the inner end of the cover plate 9.

It will thus be seen that the cover plate is secured at both its end portions in the manner described so that there is no possibility of the cover plate becoming dislocated or loosened.

The cover plate may of course be formed in any manner desired but inasmuch as there is no strain which comes upon the cover plate, we prefer to make this cover plate out of light sheet metal under which circumstances the cover plate may be formed as a stamping and the boss portion 13 can be formed by pressing the metal into the desired shape.

As will be apparent, the cover plate may be readily disassembled from the structure with which it coöperates, when the rim and tire are removed from the fixed rim of the wheel.

Having described our invention, we claim:

1. A wheel having a fixed rim with a slot formed therein which extends inwardly from a side thereof, a demountable rim adapted to accommodate a tire with a valve stem thereon, a wedge ring for holding the rim to the fixed rim, a cover coöperating with the inner side and the outer side of the fixed rim and covering the said slot, said cover having an opening through which a valve stem may extend and also provided with a portion adapted to extend between a surface of the fixed rim and the wedge ring.

2. A wheel having a fixed rim with a slot formed therein extending inwardly from a side thereof, a demountable rim for said fixed rim, said rim being adapted to accommodate a pneumatic tire having a valve stem, a wedge ring for holding the demountable rim to the fixed rim, a cover member coöperating with the inner side and one side of the fixed rim and covering the said slot, said cover member having an opening with a boss surrounding the same, through which opening the valve stem may extend, said boss being adapted to receive a nut, the cover member having an extending portion which is adapted to be positioned between the fixed rim and the wedge ring.

In testimony whereof, we hereunto affix our signatures.

ARTHUR H. ANTHONY.
CHARLES E. NORDFELDT.